United States Patent [19]
Peters et al.

[11] 3,949,793
[45] Apr. 13, 1976

[54] MANUFACTURE OF TUBULAR TYPE BATTERY PLATES

[75] Inventors: Kenneth Peters, Worsley; Robin Gordon, Stockport; Gilbert Sands, Bolton, all of England

[73] Assignee: Chloride Group Limited, London, England

[22] Filed: July 5, 1974

[21] Appl. No.: 486,154

[30] Foreign Application Priority Data
July 6, 1973   United Kingdom............... 32366/73
Apr. 9, 1974   United Kingdom............... 15768/74

[52] U.S. Cl. ............ 141/234; 137/561 A; 222/330; 239/552; 425/250
[51] Int. Cl.²........................ B65B 3/12; B65B 3/36
[58] Field of Search ........ 118/408; 137/599, 561 A, 137/561 R; 141/32, 33, 67, 131, 237, 234, 242, 248, 256, 283, 324, 325, 378, 244; 222/193, 478, 488, 330; 239/552; 425/217, 250, 245; 138/39; 264/171, 176

[56] References Cited
UNITED STATES PATENTS
2,174,335   9/1939   Tear............................... 141/248 X
2,663,478   12/1953   Jahn et al. ..................... 141/248 X FOREIGN PATENTS OR APPLICATIONS
947,796   2/1964   United Kingdom.................. 141/72

Primary Examiner—Richard E. Aegerter
Assistant Examiner—Frederick R. Schmidt
Attorney, Agent, or Firm—Oblon, Fisher, Spivak, McClelland & Maier

[57] ABSTRACT

Apparatus is disclosed for filling tubular battery plates with active material paste by extruding the paste into the tubes via feed tubes passing from an inlet end of an extrusion head to an outlet end arranged in a row. The plates are supported during the extrusion and the feed tubes proportioned so as to equalize the amount of paste fed into each individual tube.

7 Claims, 8 Drawing Figures

MANUFACTURE OF TUBULAR TYPE BATTERY PLATES

This invention relates to the manufacture of tubular type battery plates and is concerned in particular with the filling of the tubes of such plates with active material, and discloses a novel filling method, novel apparatus for carrying out the method and novel active material paste compositions.

A conventional method for making tubular plates involves impregnating fabric tubes with a resin to render them stiff though still permeable, locating the tubes on an array of lead alloy spines, one spine to each tube, and filling the space between the interior of the tubes and the spines with lead oxide powder from a hopper and shaking the assembly to compact the powder in the tubes. This method has considerable problems including waste of lead oxide powder, consistency of filling weight, and unevenness of filling.

One proposal, in British Pat. No. 947,796, for reducing these problems was to extrude an active material paste into the tubes under pressure. However this method had certain problems of unevenness of filling of the tubes and a tendency for the paste to break down and lose its fluidity under pressure and also to go solid inside the machinery if there were any intervals or delay in the production sequence.

We have discovered that these problems can severally and collectively be reduced by modification of the paste used, by modification of the apparatus used and by modification of the method used.

The present invention is concerned particularly with the apparatus.

According to the present invention apparatus for filling plates of tubular type for lead acid electric storage batteries includes means for supporting the tubes of a plate assembled on their spines, a pump and an extrusion head for extruding active material in the form of a paste, and a number of feed passages each having an inlet end connected to one of a number of ports distributed substantially uniformly around the axis of the extrusion head to receive paste from it, and an outlet end connected to or forming one of a number of extrusion nozzles arranged in a straight row and registering one with each tube of the plate. Preferably the sizes of the nozzles are graduated so that those communicating with ports remote from the axis of an extrusion head are slightly larger than those communicating with ports nearer to the said axis.

The pump is preferably provided with a recirculating passage connected to valve means serving to direct the paste either to the extrusion head or through the recirculating passage back to the pump inlet or to a hopper feeding it.

The means for supporting the tubes may include a rigid former affording a cavity which is of the desired shape of the assembly of filling tubes and in which the tubes are received. The former may comprise upper and lower platens whose opposed surfaces are shaped to provide the said cavity.

The pump may comprise a rotor in the form of a single start helix fitting in a cylinder in the form of a double start helix of twice the pitch of the rotor, the rotor being arranged to turn about its own axis in one direction, while its axis orbits about the axis of the cylinder in the opposite direction at the same speed.

The means for supporting the tubes are preferably movable between a position in which the nozzles are in registry with the tubes and a position in which the tubes are withdrawn from the nozzles and means for moving the supporting means from one position to the other.

Control means may be provided which are arranged to control the valve means to direct paste into the tubes until the tubes are filled and then to move the valve to its recirculating position to direct the paste to the inlet of the pump or a hopper feeding it. The control means may comprise a timer which can be preset to direct the paste into the tubes for a preset time and thereafter to direct the paste to the inlet to the pump or to a hopper feeding the pump.

The paste used is preferably an extrudable lead oxide active material paste composition which comprises at least one lead oxide in finely divided particulate form, a liquid vehicle and a polymer soluble in the liquid vehicle and thickening the said composition which is characterised in that the paste has a density of not more than 4.00 grams per c.c and an extrusion penetrometer penetration value (as defined herein) of at least 10 e.g., 10 to 30 and preferably 12 to 18. The paste preferably has a yield value (as defined herein) of not more than 100,000, or more desirably not more than 55,000, e.g., not more than 40,000 especially in the range 15,000 to 35,000. The density is preferably in the range 4.0 to 3.55, e.g., 3.7 to 3.9 and the yield value is preferably in the range 20,000 to 35,000 or more especially 25,000 to 35,000.

The liquid vehicle is preferably water however other liquid vehicles which do not interfere with battery performance could be used, thus aqueous sulphuric acid could be used if desired.

The soluble polymer preferably has a solubility of at least 10 grams per liter in water at 25°C and as a 1% solution at 25°C in water preferably has a viscosity of not more than 5,000 centipoise.

The lead oxide preferably has substantially all of its particles having particle sizes less then 100 microns, e.g., less than 1% by weight are above 200 microns in diameter. In addition less than 1% is below 0.001 micron in diameter. Typically at least 50%, e.g., 95% by weight is less than 50 microns, 50% by weight is less than 10 microns and 5% is less than 1 micron. The oxide may comprise a blend of grey lead oxide and red lead oxide. The ratio of grey to red lead may be in the range 95:5 to 5:95 though 90:10 to 50:50 is preferred.

The soluble polymer is preferably a poly(ethylene oxide) polymer of molecular weight of at least 500,000, e.g., at least 1,000,000 preferably 2,000,000 to 10,000,000.

A preferred composition comprises lead oxide, e.g., a 90:10 weight ratio of grey to red lead oxide, 0.2 to 0.6% by weight based on total solids of poly (ethylene oxide) of molecular weight 2,000,000 to 5,000,000 and at least 75 to 85, e.g., 90 to 100 milliliters of water per lb. of solids, the paste having a density of less than 4.0, e.g. 3.5 to 4.0 g/cc.

The present invention may be put into practice in various ways and one specific embodiment and a modification thereof will be described by way of example with reference to the accompanying drawings, in which.

Figure 1:
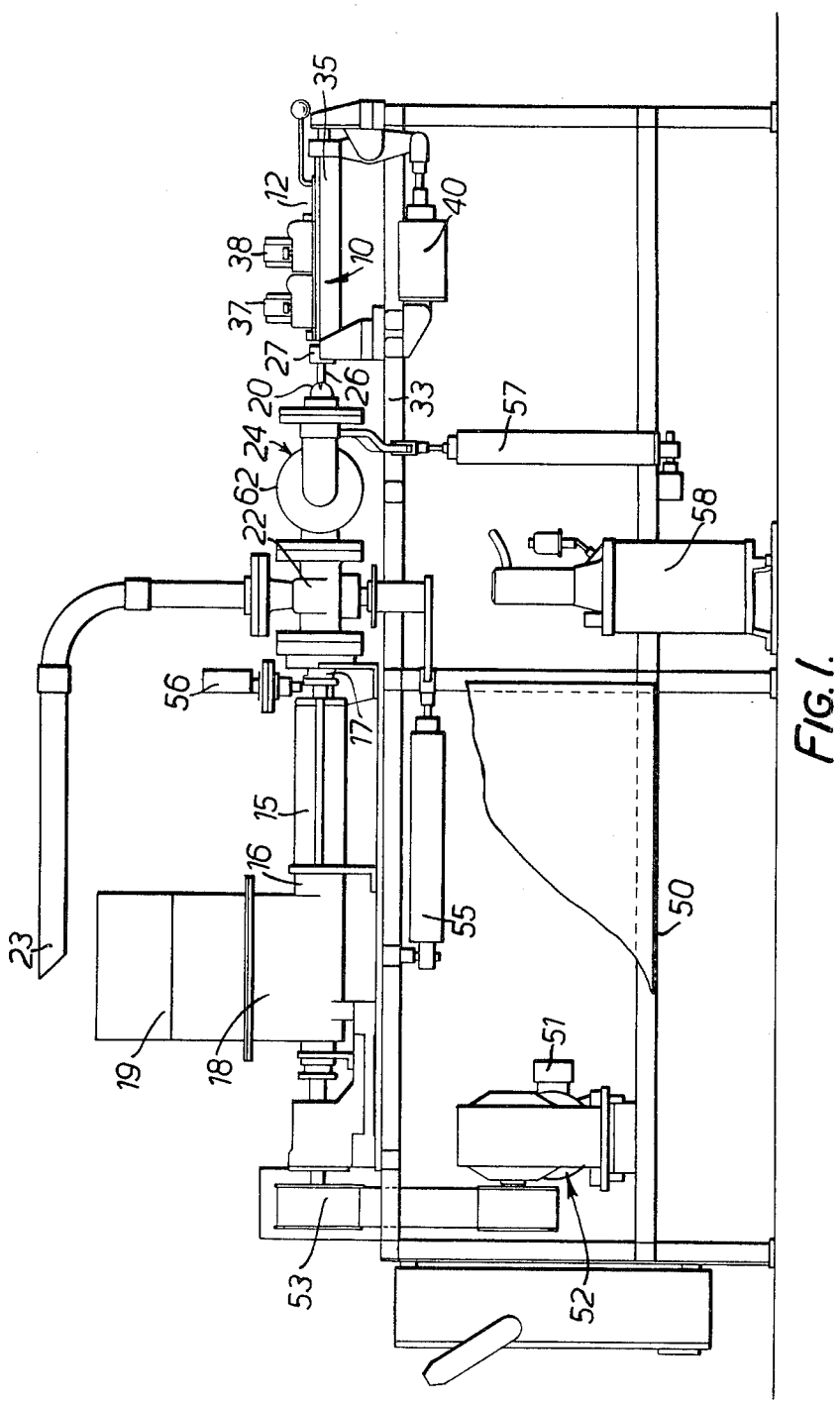
FIG. 1 is a side elevation of extrusion apparatus in accordance with the invention.
Figure 2:
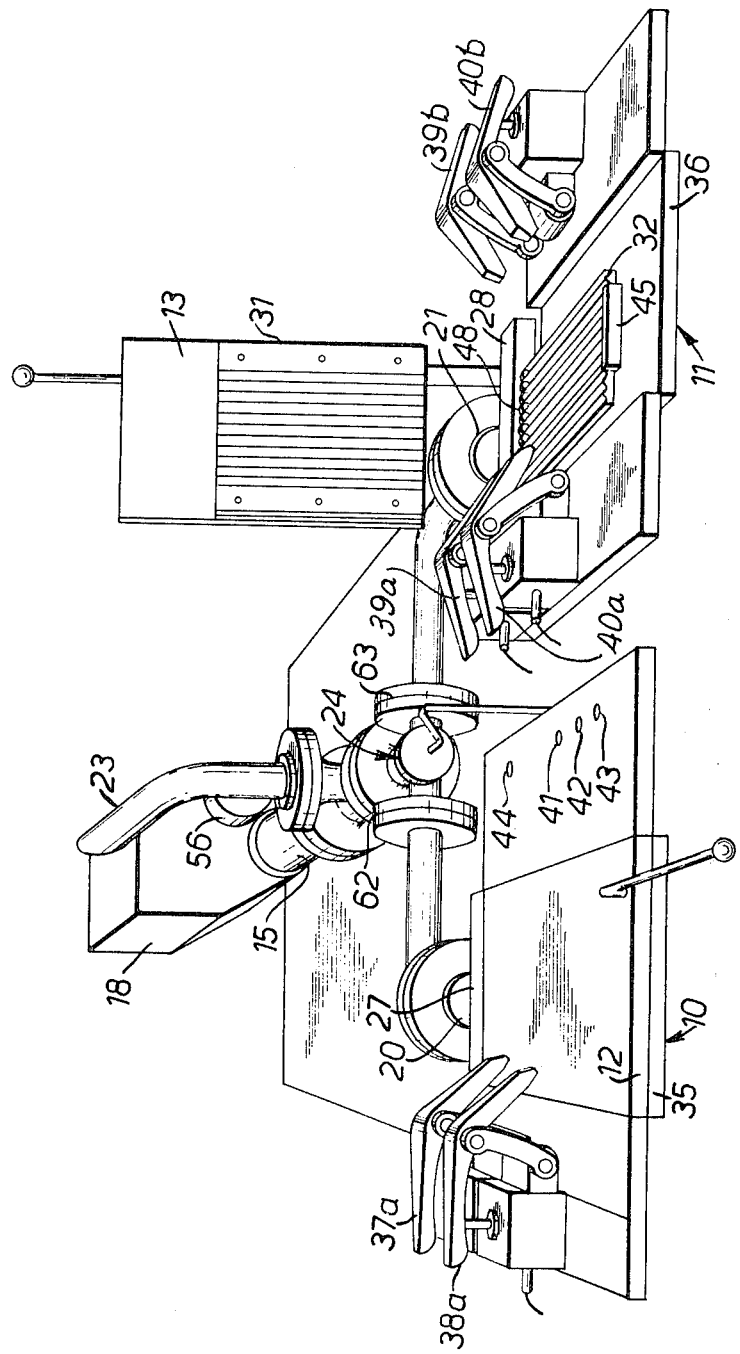
FIG. 2 is a diagrammatic perspective view from one end of the apparatus of FIG. 1 showing one tube support open and the other closed, the diagram, for clarity, only shows the upper part of the machine and one pair of hydraulic clamps have been omitted.
Figure 3:
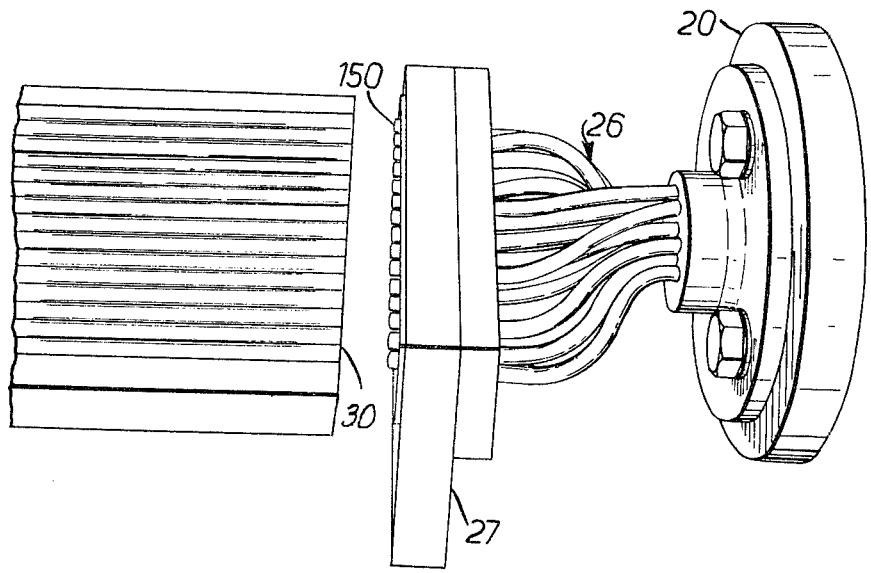
FIG. 3 is a diagrammatic side perspective view of part of the apparatus of FIGS. 1 and 2 showing the extrusion head in more detail.

Referring to FIGS. 1, 2 and 3 a machine for filling plates of tubular type, for lead acid electric storage batteries, comprises supports 10, 11 for supporting the tubes of a plate assembled on their spines, a pump 15, and a pair of extrusion heads 20, 21 for extruding active material in the form of a paste. The pump 15 is of the well-known type such as that marketed under the trade name Monopump, comprising a rotor in the form of a single start helix fitting in a cylinder in the form of a double start helix of twice the pitch of the rotor, in which the rotor turns about its own axis in one direction, while its axis orbits about the axis of the cylinder in the opposite direction at the same speed. This form of pump gives a positive displacement with uniform flow. The inlet 16 of the pump 15 is connected to a paste hopper 18 having an extension 19 containing a supply of suitable paste described in detail below. The outlet 17 of the pump 15 is connected to a two-way valve 22 by which the paste delivered from the pump 15 can be fed through a recirculating pipe 23 to the hopper 18 or can be fed forward via a selector valve 24 to the extrusion heads 20, 21 which are each connected by a number of feed tubes indicated generally as 26 to nozzle blocks 27, 28 via gauze filter screens 62 and 63.

Adjacent each nozzle block 27, 28 are the supports 10, 11 comprising tops 12, 13 and bases 35, 36, in which are mounted upper platens 29, not shown, and 31 and lower platens 30 and 32 respectively. The opposed surfaces of platens 29 and 30 are shaped to provide a cavity corresponding to the desired shape of the filled tubular type plate as are the opposed surfaces of platens 31 and 32. The bases 35 and 36 are each slideably mounted on a suitable support 33, 34 (34 is not shown) and in operation a tubular sheath or gauntlet of a woven or non-woven material such as that sold under the Trade Mark TERYLENE (polyethylene terephthallate) is placed on the lower platens 30 and 32 with the spines of the plate already received in the tubular pockets of the sheath and with its open bottom end facing the nozzle block, e.g., 28.

The upper platen for example 29, is then lowered on to the lower platen 30, and clamped to it by means of two pairs of hydraulic clamps 37a and b and 38a and b.

A similar couple of pairs of hydraulic clamps 39a and b, and 40a and b are provided for the support 11. The forward clamps 37a and b and 39a and b are fixed on the support bases 35, 36 but the rear clamps 38a and b and 40a and b are adjustably located on the support bases 35, 36 so that they can be used with a variety of lengths of plate.

Four holes 41, 42, 43 and 44 are shown on the support base 36 where the clamps 37b and 38b have been omitted. The holes 41, 42 and 43 are for the rear clamps. The hole 44 is for the front clamps.

The platens 29, 30 and 31, 32 are removably secured to the tops and bases 12, 35 and 13, 36 respectively and can be replaced by different platens when it is wished to fill different sized or shaped plates. The platens may have hemispherical grooves corresponding in dimensions to the desired filled dimensions of the plate.

As can be seen from FIG. 2, the open support 11 shows how the upper platen 31 and lower platen 32 are removably supported in the support top 13 and support base 36. A removably secured stop bar 45 is attached to the support base 36 so as to bear against the top bar of the spines of a plate when located on the lower platen. The lug of the plate extends around the side of the stop bar.

After the plate has been located in the support, the support is then moved by means of a pneumatic cylinder 46 or 47 so as to bring the mouths of the pockets to fit over the nozzles of the nozzle block, e.g., 28 in the case of cylinder 47, and seal therewith.

In one specific embodiment the plate has in it 15 pockets (FIG. 2 is only diagrammatic) each of which receives one of 15 nozzles 150 (see FIG. 3) arranged in a straight line row in the nozzle block 27 or 28. These nozzles 150 are connected to ports in the extruder head 20 or 21 which are distributed symmetrically about the axis and packed together as closely as is practicable. Thus in the particular embodiment the extruder head has a single central port surrounded by an intermediate ring of 7 ports which are in turn surrounded by an outer ring of a further 7 ports. Identifying the nozzles 150 as Nos. 1 to 15 across the row and the inlet ports as A for the central port, B to H for the intermediate ring of ports counting clockwise from a given radius, and I to O for the outer ring counting clockwise from the same radius the following table indicates which port is connected to which nozzle and indicates the diameter of the nozzle.

| Nozzle | Port | Nozzle Diameter in inches |
|---|---|---|
| 1 | I | .148 |
| 2 | B | .145 |
| 3 | O | .148 |
| 4 | N | .140 |
| 5 | H | .140 |
| 6 | J | .146 |
| 7 | C | .140 |
| 8 | A | .140 |
| 9 | D | .140 |
| 10 | K | .144 |
| 11 | G | .140 |
| 12 | F | .140 |
| 13 | L | .145 |
| 14 | E | .144 |
| 15 | M | .148 |

The inlet ends of the feed pipes 26 connecting the nozzles 150 in the nozzle blocks 27, 28 to the extrusion heads 20, 21 are secured in holes in the extrusion heads 20, 21 which are as close together as possible. To ensure a smooth flow the holes are tapered towards the tubes and the ends of the tubes are also internally chamfered to continue the taper. The taper is such that at its larger diameter the holes make point contact with adjacent holes. At the outlet ends the tubes are secured to nozzles which project about 0.3 inch into the gauntlet tubes. Alternatively the tubes could form the nozzles themselves. The bore of each nozzle 150 tapers from the diameter of the feed tube at an included angle of about 10 degrees to the orifice diameter specified in the above table, after which is flares slightly to accommodate the protruding end of the spine. The outside face of each nozzle 150 has a tapered lead-in to facilitate location in the gauntlet tube.

A face seal 48 of resilient material is interposed between the nozzle blocks 27, 28 and the end of the platens 29, 30 and 31, 32, pairs of which, e.g., 27 and 29, 30, as indicated above, are brought together by means of pneumatic cylinders 46 and 47, in the case of support 10, cylinder 46.

It is possible to adjust the sizes of the nozzles 150 to balance the paste flow, so that equal amounts issue from each nozzle. This takes into account the many variables which affect the paste flow to individual nozzles such as the position of the port in the extrusion head, the length and the amount of deformation of the tube bending, and other factors which vary the internal resistance to flow.

As indicated in FIG. 1 the apparatus is mounted on a stand 50 to bring the supports 10 and 11 to a convenient working height and to lift the apparatus clear of the floor so that production can be carried out under wet conditions to keep atmospheric lead at low levels.

Figure 4:
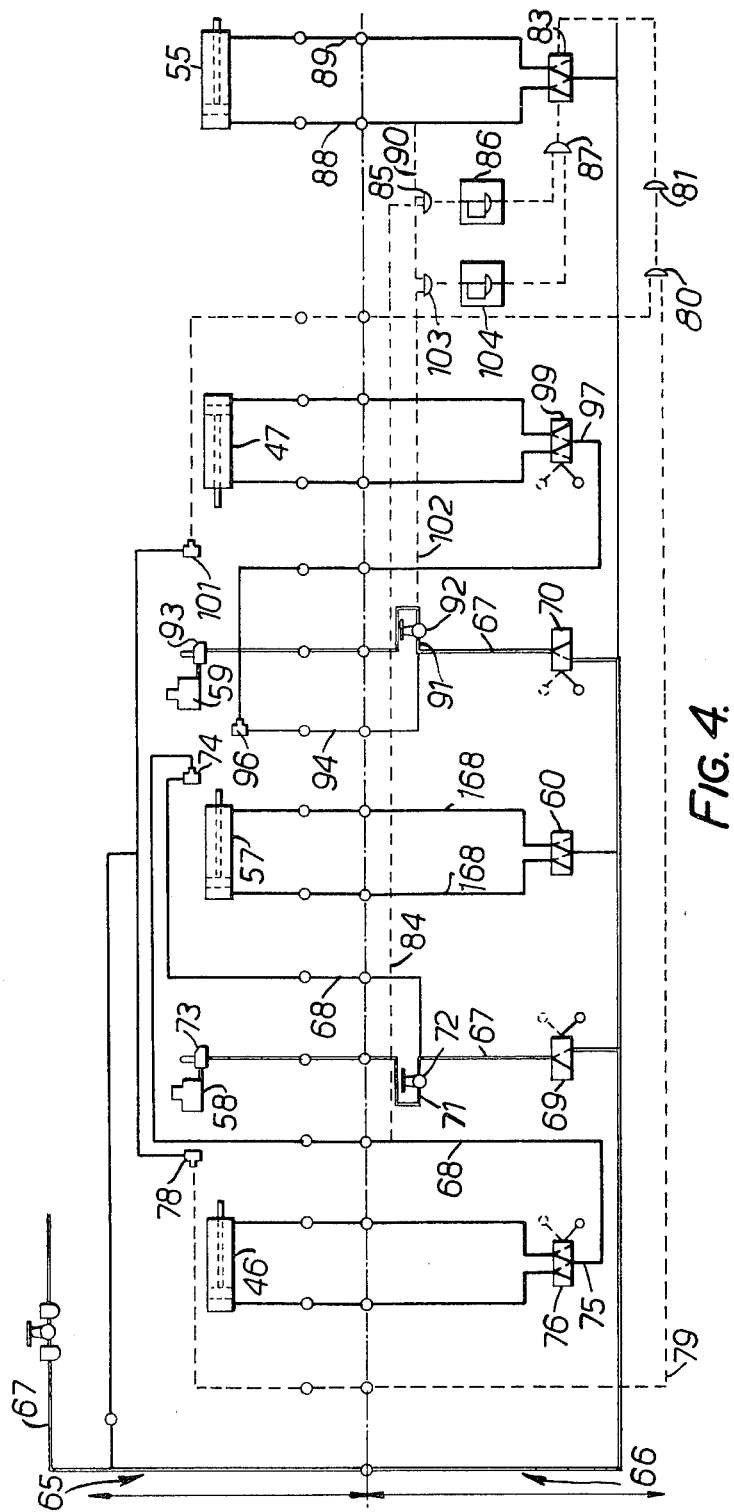
FIG. 4 is a circuit diagram of the pneumatic circuit used to control the operation of the various valves and cylinders of the machine.

The machine has an electric motor 51 controlled by a conventional electric control circuit but the remainder of the operation is under pneumatic control by the circuit shown in FIG. 4.

The motor is protected by a clutch 52 which cuts out if the load on the motor exceeds a preset value. This can occur if the system becomes blocked by pieces of dried paste which may be formed if the apparatus is left unused for long periods without being cleaned or protected by the top on the hopper and the end of the tube 23 being sealed, e.g., with polythene sheet, to prevent evaporation of water from the paste. The motor drives the pump 15 via a gearbox and toothed belt drive 53. The recirculating valve 22 is operated by a cylinder 55 under control of the pneumatic circuit.

A pressure gauge 56 is fitted at the outlet to the pump 15 to give a check of paste consistency and filling pressure during operation. The selector valve 24 is operated by a cylinder 57 again under the control of the pneumatic circuit.

The hydraulic clamps are supplied from a pair of hydraulic boosters 58 and 59 again under the control of the pneumatic circuit.

Referring to FIG. 4 the pneumatic control circuit is in two parts, one, 65, on the machine, the other, 66, in a free standing cabinet desirably positioned on the right-hand side of the machine in the sense shown in FIG. 2.

The circuit is supplied with compressed air, e.g., at 60 p.s.i. via the line 67.

This inlet supplies air via a selector valve 60 and the lines 168 to the cylinder 57 when it is wished to operate the left-hand plate support 10. The air supply to 57 causes it to operate the selector valve 24 to divert paste to the support 10. When it is wished to supply paste to the support 11 the valve 60 is operated in the opposite sense and the cylinder 57 moves the selector valve 24 to the other side.

The clamps 37a and b and 38a and b are under the control of a "clamp" valve 69, via the line 67 and regulator 71 and gauge 72. The hydraulic booster or pressure intensifier 58 is released via a quick exhaust valve 73.

A line 68 leads from the line 67 between valve 69 and regulator 71 via a pilot valve 74 to the central port 75 of a "seal and fill" valve 76, which controls the cylinder 46. Thus the support 10 cannot be moved into engagement with the nozzle block 27 until the clamps have been applied.

Moreover the pilot valve 74 is mechanically triggered by the cylinder 57 so that the cylinder 46 can only operate when the cylinder 57 is positioned so that the valve 24 will supply paste to the support 10. The valve 76 when moved to the "seal and fill" position supplies air to the cylinder 46 which slides the clamped support 10 into engagement with the nozzles and triggers the "fill" pilot valve 78 mechanically once sealing is complete. The valve 78 opens and supplies air from the line 67 via the line 79 to an "OR" pneumatic logic unit 80, the output of which goes via a pulse unit 81 to one side of a two way spool valve 83 which controls the cylinder 55, via lines 88 and 89, which operates the recirculating valve 22. A line 84 leads from a point between valves 74 and 76 to a "NOT" pneumatic logic unit 85 the output of which is connected via a timer 86 to an "OR" pneumatic logic unit 87 the output of which is connected to the other side of the spool valve 83. The other input to the "NOT" unit 85 is by a line 90 from the line 88.

The circuit for the support 11, the right-hand side in FIG. 2, is identical to that for the left-hand side already described.

Thus "clamp" valve 70 controls the clamps 39a and b and 40a and b via regulator 91 and gauge 92 with the assistance of booster 59 exhausting via a quick exhaust valve 93. A line 94 runs from the junction of the valves 70 and regulator 91 via pilot valve 96, which is mechanically operated by the cylinder 57 when the selector valve 60 is used to select the right-hand support, to the central port 97 of the right-hand "seal and fill" valve 99 which controls the cylinder 47 which operates the base 36 of the support 11. This is shown in the oper position in FIG. 2 separated from the nozzle block 28 The cylinder 47 mechanically operates a pilot valve 101 when operated to seal the support 11 on the nozzle block 28 so as to supply air from the inlet line 67 to a second input to the "OR" unit 80. A line 102 runs from between the valves 96 and 99 to the inlet to a "NOT" pneumatic logic unit 103 the output from which goes via a pneumatic timer 104 to the other input to the "OR" unit 87. The line 90 also supplies an input to the "NOT" unit 103.

The lines 67 are ½ inch external diameter copper o nylon tube. The lines 68, 88, 89, 94 are 5/16 inch exter nal diameter copper or nylon and the lines 84, 90 and 102 are 3/16 inch copper or nylon tube.

The operation of the apparatus is as follows:

A suitable paste described in more detail below i made up and placed in the hopper 18, 19 and the moto 51 started with the recirculating valve 22 positioned t direct the paste coming from the end of the pump 1 into the tube 23 and thus back into the hopper. Wit the pastes described below, the pressure shown by th gauge 56 should be in the range 20 to 40 p.s.i. Thi ensures that the paste is fully mixed and of the correc consistency for extrusion.

The selector valve 60 is then positioned for one sid e.g. lefthand side, thus opening the valve 24 to th lefthand extrusion head 20, and a sheath with th spines in position is laid on the bottom platen 30 wit the top bar against the stop bar 45 and the top 12 of th support brought down. The timer 104 is set for the desired filling period, e.g., 8 seconds for a plate having 15 tubes 9 inches long and holding about 500 grams of the paste described below. The clamping valve 69 is then actuated to cause the clamps 37 and 38 to operate and engage the top 12 and hold it down against the base 35. The "seal and fill" valve is than actuated so that the cylinder 46 slides the support 10 into engagement with the nozzle block 27.

This triggers the pilot valve 78 which via the units 80 and 81 applies air to the valve 83 which operates the cylinder 55 so as to change the valve 22 from the "recirculating" to the "fill" position. The paste is then pumped via the valve 22, selector valve 24, filter screen 62, extrusion head 20, and nozzle block 27 into the tubes for 8 seconds. The pressure on the gauge 56 rises from about 40 initially to 120 p.s.i. in 2 seconds and then slowly rises over 5½ to 6 seconds to 175 p.s.i. and then at the end of the timed period drops rapidly back down to the initial value and the timer 104 switches the valve 83 and thus the cylinder 55 and valve 22 to direct the paste output from the pump 15 to the recirculating tube 23.

Thus the timer is arranged to return the valve to its recirculating position automatically when the pockets of the plate will have been filled.

When this filling is occurring a gauntlet with the spines in position is placed in the righthand support and the top 13 brought down into the closed position.

When the lefthand filling is complete as indicated by the pressure gauge 56, the valve 76 is released, the support 10 then retracts from the nozzle block 27. The "clamp" valve 69 is then released and the clamp retracts to the position shown on the righthand side of FIG. 2 clear of the top 13 of the support. The clamps are spring loaded to this position.

The selector valve 60 is then switched to select the righthand side and this also opens pilot valve 96. "Clamp" valve 70 is actuated which opens the supply to pilot valve 96. "Seal and fill" valve 99 is then actuated and the support 11 is moved into sealing engagement with the nozzle block 28, the valve 101 triggered and the recirculating valve 22 redirected to the "fill" position via the timer 86 and valve 83.

The same filling sequence then occurs as described above. While this occurs the top 12 of support 10 is lifted up, the filled plate removed and passed to a bottom bar fitting station. Excess paste, if any, is cleared from the platen and a fresh gauntlet placed in position and the top 12 lowered down again. At the end of the filling cycle, the "seal and fill" valve 99 is released, the valve 22 redirects the output from the pump 15 to the tube 23, the support 11 retracts from the nozzle block 28, and the "clamp" valve 70 is released. The selector valve 60 is then returned to the lefthand position and the cycle repeated.

The use of a pump giving smooth delivery in conjunction with a recirculating valve and passage ensuing continuous movement of the paste reduces or eliminates surging and keeps the paste of uniform consistency and uniformly timed throughout the working period.

The paste used contains lead oxide water and a high molecular weight poly (ethylene oxide) made by suspension polymerisation of ethylene oxide preferably that sold by Union Carbide as POLYOX WSR 301 (Trade Mark) which has a molecular weight of about 4,000,000 and a viscosity as a 1% by weight solution in water of 1,500 to 3,500 centipoise at 25°C.

The material is a polyether and is believed to hydrogen bond strongly with water, and is nonionic.

EXAMPLES 1 TO 6.

A number of paste compositions were made by using 0.4% by weight of POLYOX WSR 301 based on the dry solids. The lead oxide and the POLYOX were first dry blended and then the water added slowly with continuous mixing and cooling of the paste.

Tables 1A and 1B below give the results obtained in a series of experimental production runs using the plates described above.

TABLE 1A

| Ex. | Paste Composition | Density g.cc | Consistency (5) | Yield Value dynes.cm$^{-2}$ | Mean Wet Paste Wt g | Standard deviation | Mean Dry Paste Wt g | Production Rate per hour | Scrap % | No. of Stoppages per hr. |
|---|---|---|---|---|---|---|---|---|---|---|
| 1) | 90% grey lead oxide 10% Red lead oxide 97 cc/lb water | 3.73 | 16 | 26400 | 550 | 13.7 | 465 | 278 | 8.4 | 4 |
| 2) | 90% grey lead oxide 10% Red lead oxide 100 cc/lb water | 3.75 | 14 | 33900 | 564 | 11.1 | 475 | 278 | 3.3 | 8 |
| 3) | 90% Grey lead oxide 10% Red lead oxide 91 cc/lb water | 3.77 | 14 | 33900 | 570 | 9.1 | 476 | 378 | 0.5 | 3 |
| 4) | 90% Grey lead oxide 10% Red lead oxide 94 cc/lbs water | 3.74 | 14 | 33900 | 560 | 10.1 | 472 | 390 | 1.5 | 4 |
| 5) | 80% Grey lead oxide 20% Red lead oxide 77 cc/lbs water | 3.99 | 15 | 30400 | 574 | 9.2 | 486 | 370 | 1.8 | 5 |

TABLE 1B

| Ex. | Paste Composition | Density g.cc | Consistency | Yield value | Mean Wet Paste Wt g | Standard deviation | Mean Dry Paste Wt g | Production Rate per hour | Scrap % | No. of Stoppages per hr. |
|---|---|---|---|---|---|---|---|---|---|---|
| 6) | 80% grey lead oxide 20% Red lead oxide | 3.92 | 15 | 30400 | 547 | 7.2 | 464 | The duration of test did not enable productivity rate etc., to be estimated. | | |

TABLE 1B-continued

| Ex. | Paste Composition | Density g.cc | Consistency | Yield value | Mean Wet Paste Wt g | Standard deviation | Mean Dry Paste Wt g | Production Rate per hour | Scrap % | No. of Stoppages per hr. |
|---|---|---|---|---|---|---|---|---|---|---|
| | 81 cc/lb water | | | | | | | | | |

Notes on tables 1A and 1B

1. In Example 6, the plate formers are modified slightly to reduce filling weight
2. A minimum sample selection of 50 was used for mean weight determination
3. After Example 2 the screens 62 and 63 were placed in the filling arms to prevent minor blockages in the nozzles.
4. Stoppages and scrap during production trails were due to:
   i. Occasional faulty gauntlet tubes.
   ii. Occasional underfills.
   iii. Wipe down and cleaning of plate former.
5. Consistency measurements were taken with an Extrusion penetrometer as described with reference to FIG. 5
6. Yield value is calculated from the consistency using the relationship described below.

Figure 6:
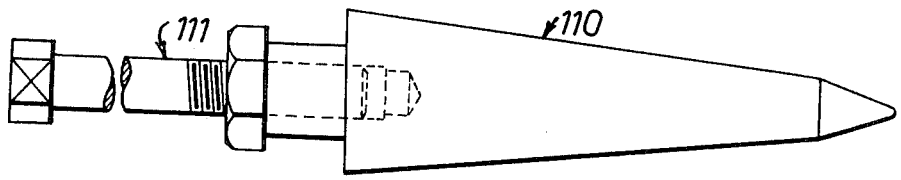
FIG. 6 is a longitudinal cross-section of an extrusion penetrometer used to measure paste consistency.
Figure 7:
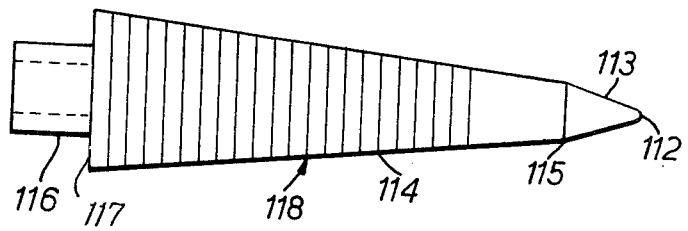
FIG. 7 is a detailed view of the head of the device shown in FIG. 6.
Figure 8:
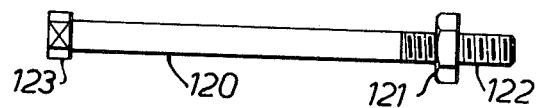
FIG. 8 is a detailed view of the stem of the device shown in FIG. 6.

The consistencies quoted herein were measured on an extrusion penetrometer as shown in FIGS. 6, 7 and 8.

This device consists of a conical head 110 with a stem 111, the two parts together weigh 233 grams. The head shown in detail in FIG. 7 has 1/32 diameter spherical tip 112 which broadens into a conical end 113 having an included angle of 37° and an axial length of ½ from the end of the tip 112. The end 113 then continues as a conical flank 114 of shallower taper having an included angle of 12°. The diameter of the head at the junction 115 of the end 113 and the flank 114 is ⅜. The flank 114 has an axial length of 3 and an end diameter of 1. A stub 116 extends from the top end 117 of the flank and has an axial thread hole in it to receive the stem 11. The flank 114 has transverse lines 118 stamped on it 0.1 inches apart. The junction 115 is 0.5 inches from the first line which is marked 6, the next line is marked 7.

The head is made of brass and weighs 173 grams and is machined and polished.

The stem 111 shown in FIG. 8 consists of a rod 120 weighing 54 grams with a nut 121 weighing 6 grams threaded on one end 122. The other end is formed as a nut 123.

The device is used by being held with the tip 112 in the paste with the junction 115 level with the surface of the paste and the device is then released and the line 118 next to the surface of the paste when the device comes to rest is read off and is the extrusion penetrometer penetration value as herein defined.

The yield value is calculated from the consistency by use of the equation $$\text{Yield value} = S_o = Kmg/h^2$$

where $k$ is a constant
$m$ = mass of cone in grams = 173
$g$ = 981 cm. sec$^{-2}$. and
$h$ = depth of penetration of cone in cms.
$k$ = (1/Π) Cosine$^2$ $\alpha$ cotangent $\alpha$
where $\alpha$ = 12°.

With the device described above consistency value is related to yield value as listed below.

| Consistency value | Yield value dynes. cm$^{-2}$ |
|---|---|
| 20 | 18400 |
| 19 | 20400 |
| 18 | 21900 |
| 17 | 24000 |
| 16 | 26400 |
| 15 | 20400 |
| 14 | 33900 |
| 13 | 38000 |
| 12 | 42900 |
| 11 | 47500 |
| 10 | 52900 |

EXAMPLE 7

A paste was made up containing 90% grey lead oxide and 10% red lead oxide with 0.4% by weight of POLYOX WSR 301 and 100 cc of water per pound of solids. This paste had a density of 3.74 gr/cc and an extrusion penetrometer value of 15 and a yield value of 30,400 dynes cm$^{-2}$. Positive plates having 15 tubes each 9 inches long were filled with this paste, bottom bars fitted and the plates dried at 83°C for 16 hours and then immersed in concentrated sulphuric acid (sp. gr 1.400) for 6 hours then assembled into battery containers —seven positives with seven standard negative plates and sulphuric acid of specific gravity 1.140 placed in the cell to cover the plates. The assembly was then charged for 48 hours on a modified constant potential circuit with an initial current of 12 amps per cell tapering to 1.3 amps at the end of charge. The specific gravity at the end of the charge was 1.260 (25°C).

The total weight of the dried sulphated positive plates in each cell was 3,000 grams.

EXAMPLE 8

Comparison cells using standard shaken powder filled positives made from a dry blend of granulated 50% grey lead oxide and 50% red lead oxide were made up in the same way as for the cells of Example 7 and charged in the same way. The total weight of dried sulphated positive plates in each cell was 2,880 grams.

A comparison for the cells of Examples 7 and 8 of discharge duration in hours at a discharge rate of 22 amps to a voltage of 1.70 volts is given in Table 2.

The figures for Example 7 are an average of the three worst cells out of six and the figures for Example 8 are an average of three cells.

TABLE 2

| Discharge Number | 1 | 2 | 3 | 4 | 5 | 6 | 7 | 8 | 9 | 10 |
|---|---|---|---|---|---|---|---|---|---|---|
| Example | | | | | | | | | | |

TABLE 2-continued

| Discharge Number | 1 | 2 | 3 | 4 | 5 | 6 | 7 | 8 | 9 | 10 |
|---|---|---|---|---|---|---|---|---|---|---|
| 7 | 3.91 | 4.27 | 4.49 | 4.68 | 4.82 | 4.97 | 5.11 | 5.40 | 5.39 | 5.29 |
| 8 | 4.35 | 4.49 | 4.52 | 4.74 | 4.77 | 4.87 | 4.94 | 4.99 | 5.03 | 5.02 |
| Temperature of discharge °C | 30 | 23 | 25 | 29 | 28 | 27 | 28 | 29 | 28 | 25 |

EXAMPLES 9 TO 20

A number of cells were then made up as described for Example 7 with varying weights of oxides, POLYOX WSR 301 and water in the plates, the plates being dried before being sulphated. These are Examples 10, 15, 17 and 19. Other cells were made up in very similar manner except that the plates after filling were stored in a damp condition covered with damp clothes for up to three days before immersion wet in the concentrated sulphuric acid (pickling). These are Examples 9, 14, 16 and 18.

Other cells were made up at varying weight of oxide in a manner identical to those of Example 8. These are Examples 11, 12, 13 and 20.

Table 3 below gives details of the paste compositions, oxide weights, and discharge durations for Examples 9 to 20.

The weights of oxide in the positive plates and the discharge durations are average values of three cells for Examples 9, 10, 14, 15, 16 and 17, of six cells for Examples 18 and 19 and of two cells for Examples 12, 13 and 20.

The grey lead oxide used in Examples 1 to 6, 9, 10, 14 and 15 was a ball milled oxide having a particle size such that 100% by weight was less than 53 microns in diameter and 50% by weight was less than 10 microns.

The grey lead oxide used in Examples 16 to 19 was a ball milled oxide having a particle size such that 50% by weight had a particle size less than 53 microns and 5% by weight had a particle size less than 5 microns. The "grey lead oxide" used for examples 11, 12, 13 and 20 was a blend of the grey lead oxide used in Examples 1 to 6 with red lead oxide and sulphuric acid made into small granules all less than 0.85 mms across but all more than 0.15 mms across.

The arrangement has been shown with the two support die arrangement of FIG. 1 but if desired this could be replaced by a single die arrangement using the same screen and extrusion head arrangement as shown in FIG. 3 or by any other suitable extrusion head, e.g., a fish tail die.

Indeed the arrangement in FIGS. 1 and 2 could have alternative extrusion heads provided if desired and a single head or more than two heads provided if desired.

Figure 5:
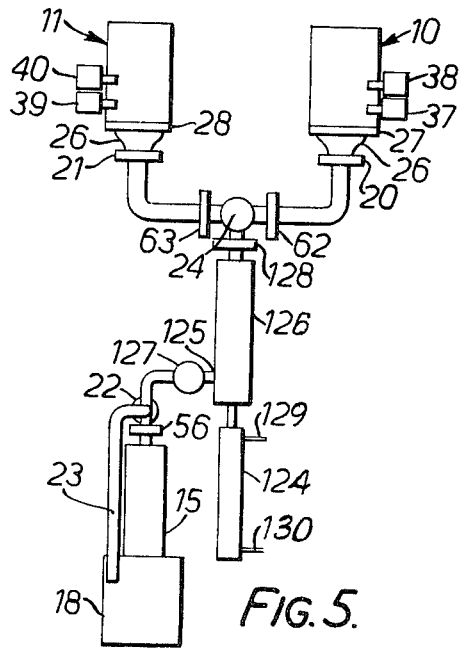
FIG. 5 is a diagrammatic plan view of a modification of the apparatus shown in FIGS. 1, 2 and 3 of particular use for filling long plates.

The operation of the arrangement shown in FIG. 5 is as follows:

The paste is put in the hopper 18 and mixed by the pump 15 and recirculated through the pipe 23 until the pressure gauge 56 shows a suitable value. The cylinder 124 is then retracted to bring the ram in the extruder 126 to the rear of the inlet port 125. The valve 22 is then switched to divert the paste from the pump 15 to the extruder 126. The valve 24 is kept closed. The valve 22 is kept in this position until the cylinder of the ram 126 is filled with either a single paste charge for a plate, or a multiple of charges. A metering valve 127 is used for this control. The valve 22 is then switched to recirculate the paste through the tube 23. The changeover valve 24 is then opened to the desired support 10 or 11 and the ram 126 operated by the cylinder 124 until the tube is filled either by extruding the paste for a timed period or by reference to the pressure indicated on a pressure gauge 128 located between the cylinder 126 and the valve 24 or for a predetermined length of stroke.

The cylinder 124 is then halted and the valve 24 changed over to switch the paste to the other support, which is then filled in a similar manner, whilst the filled plate in the other support is removed and replaced by an empty gauntlet.

This sequence is continued till the charge of paste in

TABLE 3

| Example | Grey lead oxide | Red lead oxide | Water cc/lb oxide | POLYOX WSR 301 | Weight of positive oxide per cell grams | Condition prior to picking | Discharge No. 1 | 5 | 10 | 45 | 80 |
|---|---|---|---|---|---|---|---|---|---|---|---|
| 9 | 1 | 2 | 75 | 0.3% | 1474 | wet | 4.3 | 5.3 | 6.3 | 5.4 | — |
| 10 | 1 | 2 | 75 | 0.3% | 1488 | dry | 4.3 | 5.5 | 6.1 | 5.3 | — |
| 11 | 1 | 1 | — | — | 1517 | dry | 3.55 | 5.25 | 5.75 | 5.5 | — |
| 12 | 1 | 1 | — | — | 1468 | dry | 4.0 | 5.5 | 5.5 | 5.1 | 5.0 |
| 13 | 1 | 1 | — | — | 1481 | dry | 3.5 | 5.25 | 5.25 | 5.0 | — |
| 14 | 1 | 1 | 75 | 0.3% | 1422 | wet | 4.9 | 5.6 | 6.1 | 5.3 | 5.0 |
| 15 | 1 | 1 | 75 | 0.3% | 1414 | dry | 5.6 | 6.1 | 6.4 | 5.4 | 5.1 |
| 16 | 9 | 1 | 72 | 0.4% | 1486 | wet | 3.2 | 4.85 | 5.3 | 5.2 | — |
| 17 | 9 | 1 | 72 | 0.4% | 1481 | dry | 2.7 | 4.5 | 4.8 | 5.0 | — |
| 18 | 9 | 1 | 75 | 0.35% | 1447 | wet | 2.48 | 5.2 | — | — | — |
| 19 | 9 | 1 | — | — | 1427 | dry | 3.26 | 4.75 | — | — | — |
| 20 | 1 | 1 | — | — | 1467 | dry | 3.7 | 5.35 | — | — | — |

This arrangement shown in FIG. 5 is the same as that shown in FIGS. 1 and 2 apart from the provision of a ram extruder 126 reciprocably driven by a pressure cylinder 124 provided with reversible pressure feed supply lines 129, 130. These would be controlled by suitable valves and timers (not shown) which could be incorporated into the circuit shown in FIG. 4.

the extruder 126 is used up. The valve 24 is then closed, the ram in the extruder is drawn back past the port 125, the valve 22 switched to direct paste from the pump 15 and the extruder 126 filled with a metered charge controlled by the valve 127.

The arrangements in FIGS. 1, 2 and 3 and in FIG. 5 have been described with a timer being used to control paste flow however other means could be used instead e.g. a detector which would sense by pressure or electrical capacitance when the tubes were full and would stop the paste flow by moving the valve to the recirculating position.

What we claim as our invention and desire to secure by Letters Patent is:

1. Apparatus for filling plates of the tubular type for lead acid electric storage batteries which includes:
    means for supporting tubes of a plate assembled on their spines,
    a pump and an extrusion head fluidically connected to said pump for extruding active material in the form of a paste, and
    a plurality of feed passages each having an inlet end connected to one of a plurality of ports distributed substantially uniformly around the longitudinal axis of the extrusion head to receive paste from it, and an outlet end communicating with one of a number of extrusion nozzles arranged in a straight row and registering one with each tube of the plate,
    the sizes of the nozzles being graduated so that those communicating with ports remote from the axis of the extrusion head are larger than those communicating with ports nearer to said axis, whereby the amount of paste issuing from each nozzle is substantially the same.

2. Apparatus as claimed in claim 1 in which the pump is provided with a pump inlet and a recirculating passage connected to selector valve means serving to direct the paste either to the extrusion head or through the recirculating passage back to the pump inlet or to a hopper feeding it.

3. Apparatus as claimed in claim 2 in which control means are provided which are arranged to control the valve means to direct paste into the tubes until the tubes are filled and then to move the valve to its recirculating position to direct the paste to the inlet of the pump or a hopper feeding it.

4. Apparatus as claimed in claim 3 in which the control means comprise a timer which can be preset to control the selector valve means to direct the paste into the tubes for a preset time and thereafter to direct the paste to the inlet to the pump or to a hopper feeding the pump.

5. Apparatus as claimed in claim 1 in which the means for supporting the tubes includes a rigid former affording a cavity which is of the shape the assembly will have when filled and in which the tubes are received.

6. Apparatus as claimed in claim 5 in which said rigid former comprises upper and lower platens whose opposed surfaces are shaped to provide the said cavity.

7. Apparatus as claimed in claim 1 in which the means for supporting the tubes are movable between a position in which the nozzles are in registry with the tubes and a position in which the tubes are withdrawn from the nozzles and means for moving the supporting means from one position to the other.

* * * * *